United States Patent
Yoneda et al.

[11] Patent Number: 6,006,141
[45] Date of Patent: Dec. 21, 1999

[54] NUMERICAL CONTROLLER

[75] Inventors: Takao Yoneda; Takayuki Hotta; Moriaki Sakakura, all of Nagoya, Japan

[73] Assignee: Toyoda Koki Kabushiki Kaisha, Kariya, Japan

[21] Appl. No.: 08/886,544

[22] Filed: Jul. 1, 1997

[30] Foreign Application Priority Data

Jul. 2, 1996 [JP] Japan ................................. 8-172549

[51] Int. Cl.$^6$ .................................................. G06F 19/00
[52] U.S. Cl. ........................................... 700/169; 700/177
[58] Field of Search ..................................... 364/138, 136, 364/140.01, 140.02, 140.04, 184–186, 191, 474.11, 474.14, 474.19, 474.22, 474.23; 318/568.1, 569, 562, 571

[56] References Cited

U.S. PATENT DOCUMENTS

| | | | |
|---|---|---|---|
| 3,882,305 | 5/1975 | Johnstone | 235/151.11 |
| 4,670,834 | 6/1987 | Byal et al. | 364/186 |
| 5,124,622 | 6/1992 | Kawamura et al. | 318/569 |
| 5,274,546 | 12/1993 | Kinoshita | 364/186 |
| 5,555,347 | 9/1996 | Yoneda et al. | 395/82 |

FOREIGN PATENT DOCUMENTS

| | | |
|---|---|---|
| 0 037 721 | 10/1981 | European Pat. Off. . |
| 0 553 349 | 8/1993 | European Pat. Off. . |
| 0 401 376 | 3/1996 | European Pat. Off. . |
| 57-211604 | 12/1982 | Japan .................... 364/474.11 |
| 2-62606 | 3/1990 | Japan . |
| WO 97/04371 | 2/1997 | WIPO . |

OTHER PUBLICATIONS

Patent Abstracts of Japan, vol. 11, No. 272 (M–622), Sep. 4, 1987, JP 62 074557, Apr. 6, 1987.

*Primary Examiner*—William Grant
*Assistant Examiner*—Steven R. Garland
*Attorney, Agent, or Firm*—Oblon, Spivak, McClelland, Maier & Neustadt, P.C.

[57] ABSTRACT

A numerical controller includes a control section for controlling operation of a machine, an application section which is separated from the control section and adapted to input data into the control section and to monitor a control status, and a communication network for connecting the control section and the application section. This structure makes it possible to reduce the overall size of the numerical controller. A program for a new function or an abnormality diagnosis program is also transmitted from the application section to the control section when required.

4 Claims, 11 Drawing Sheets

FIG. 7

| ABNORMALITY CODE | NAME OF DIAGNOSIS PROGRAM |
|---|---|
| 001024000001 | diag 1 |
| 001024000056 | diag 2 |
| 0010240000** | diag 3 |
| 00102400**** | diag 4 |
| 00102****** | diag 5 |
| ⋮ | ⋮ |

NUMERICAL CONTROLLER

BACKGROUND OF THE INVENTION

1. Field of the Invention

The present invention relates to a numerical controller which is compact and capable of providing a variety of functions.

2. Discussion of the Related Art

In a conventional numerical controller, a control section and an application section are integrated as a single unit. The control section is used for controlling a machine. The application section is used for inputting data into the control section, as well as for displaying a control status and other items. Such a conventional numerical controller allows a machine operator or a maintenance person to perform switching among a plurality of screens in order to perform various kinds of work. Also, on its control panel, the numerical controller has a keyboard for inputting data into the control section and a large display for displaying a detailed control status.

The numerical controller stores therein an NC program suitable for a machine to be controlled, as well as a system program required for execution of the NC program. Through replacement of the NC program, the numerical controller can control the machine in accordance with the shape of a workpiece.

The numerical controller also stores an abnormality diagnosis program. When an abnormality occurs during operation, the abnormality diagnosis program is executed in order to diagnose the abnormality, and the result of the diagnosis is displayed on the large display.

As described above, since the operation panel of the conventional numerical controller is provided with the keyboard and the large display, which the machine operator does not use in the course of ordinary operations, the size of the numerical controller cannot be reduced. In addition, when a plurality of machine tools are to be controlled, a plurality of numerical controllers must be used, inevitably resulting in an increase in the number of keyboards and displays that are not used in the course of ordinary operations.

Moreover, when after the installation of a machining system with a numerical controller, another machining system with a numerical controller having a new function is added, there occurs a problem that the new function can be used in one numerical controller but cannot be used in the other numerical controller. In order to allow the numerical controller not supporting the new function to execute an NC program which requires the numerical controller to have a system program for the new function, the system program for the new function must be installed to the numerical controller. However, since the system program is usually stored in a ROM, the operation for installing the system program for the new function into the ROM is complex. Especially, when there are a plurality of numerical controllers, the system program for the new function must be installed to each of the numerical controllers, so that the installation operation becomes troublesome.

Moreover, in the case where an abnormality diagnosis program is stored in the numerical controller, a memory having a large capacity must be used for storing the diagnosis program, because the diagnosis program is composed of many diagnosis subprograms corresponding to various kinds of conditions. When a plurality of numerical controllers are used, a memory having a large capacity must be provided in each numerical controller.

SUMMARY OF THE INVENTION

In view of the above-described problems, an object of the present invention is to provide an improved numerical controller which is compact and capable of realizing many functions.

According to a first aspect of the present invention, there is provided a numerical controller which includes a control section for controlling operation of a machine, an application section which is separated from the control section and adapted to input data into the control section and to monitor a control status, and communication means for connecting the control section and the application section.

In the numerical controller, since only the control section is installed on the machine side, the overall size of the numerical controller can be decreased. In addition, since the functions of the control section disposed on the machine side can be limited to functions required for machining operation, the size of the control section can be decreased, so that the installation space for the control section can be reduced.

Preferably, the application section comprises switch means that enables connection with a plurality of the control sections. In this case, it becomes possible to control a plurality of control sections through use of a single application section.

More preferably, the control section comprises control means capable of controlling the machine independently of the application section, and control initiation instructing means for instructing the control means to start the control. In this case, when the application section is not connected to the communication means, the machine can be operated through use of only the control section.

According to a second aspect of the present invention, there are further provided system program storage means disposed in the application section and adapted to store a system program for a function that is not supported by the control section, judgment means for judging whether or not an NC program sent from the application section to the control section contains a command which requires the system program for the function that is not supported by the control section, and transmission means for transmitting the system program for the function from the application section to the control section when the judgment means judges that the system program of the function is required.

In the numerical controller according to the second aspect, when an NC program requires a system program for a new function that is not stored in the control section, the system program for the new function is transmitted from the application section to the control section. Accordingly, the system program for the new function is not required to be manually stored in the control section. Moreover, even when a plurality of control sections are used, the system program for the new function is stored in the application section only, and the system program is transmitted to the respective control sections. This enables the respective control sections to execute an NC program that requires the system program for the new function.

According to a third aspect of the present invention, there are further provided diagnosis program storage means provided in the application section and adapted to store a plurality of kinds of diagnosis programs for diagnosing abnormalities which may occur in the control section, abnormality data transmission means for transmitting to the application section abnormality data indicating the details of an abnormality of the control section upon occurrence of such an abnormality in the control section, diagnosis program selection means for selecting a diagnosis program required for abnormality diagnosis of the control section in accordance with the abnormality data transmitted from the abnormality data transmission means, diagnosis program transmission means for transmitting the selected diagnosis program to the control section, diagnosis program execution means provided in the control section in order to execute the transmitted diagnosis program, and diagnosis result transmission means for transmitting a diagnosis result to the application section so as to display the diagnosis result.

In the numerical controller according to the third aspect, when an abnormality occurs in a control section, a diagnosis program is transmitted from the application section to the control section, and the transmitted diagnosis program is executed at the control section side. Accordingly, the load of the communication means can be reduced as compared to the case where the application section receives from the control section a huge amount of data required for abnormality diagnosis.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 7 shows an indexing table containing abnormality codes and the names of corresponding diagnosis programs.

DETAILED DESCRIPTION OF THE PREFERRED EMBODIMENT

An embodiment of the present invention will now be described with reference to the drawings.

Figure 1:
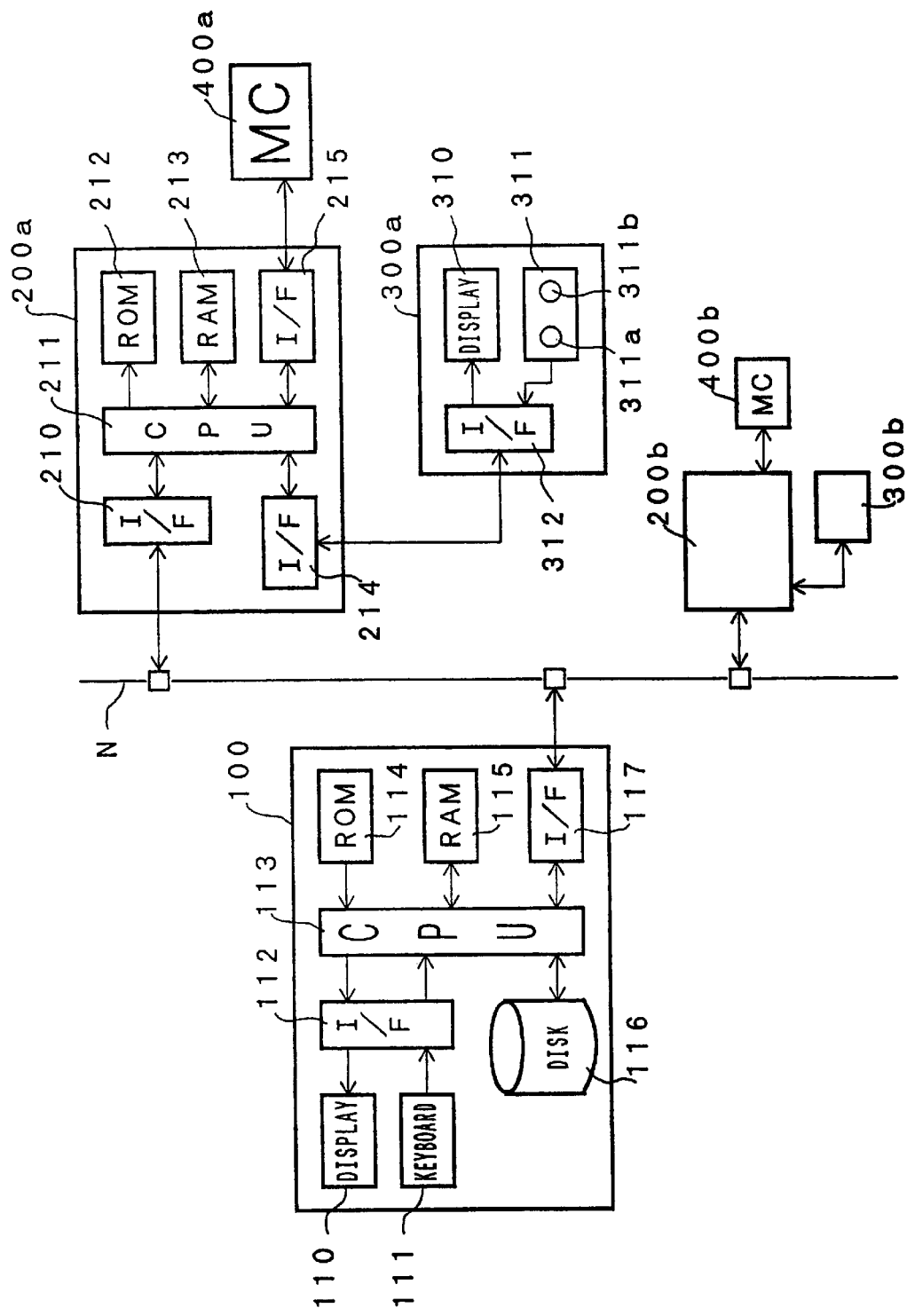
FIG. 1 is a block diagram of a numerical controller according to an embodiment of the present invention.

FIG. 1 shows the overall structure of a numerical controller according to an embodiment of the present invention.

In FIG. 1, numeral 100 denotes an application unit used for inputting data and for monitoring a control status, numerals 200a and 200b each denote a control unit for controlling a machine tool in accordance with an NC program and other data transmitted from the application unit 100, and numerals 300a and 300b each denote a compact operation panel for instructing start and emergency stop of the control unit 200a or 200b. The application unit 100 and the control units 200a and 200b are connected with each other via, for example, a serial communication network N so that they can exchange various kinds of data therebetween. Since the structure of the control unit 200b is identical to that of the control unit 200a, only the structure of the application unit 100 and that of the control unit 200a will be described.

Figure 2:
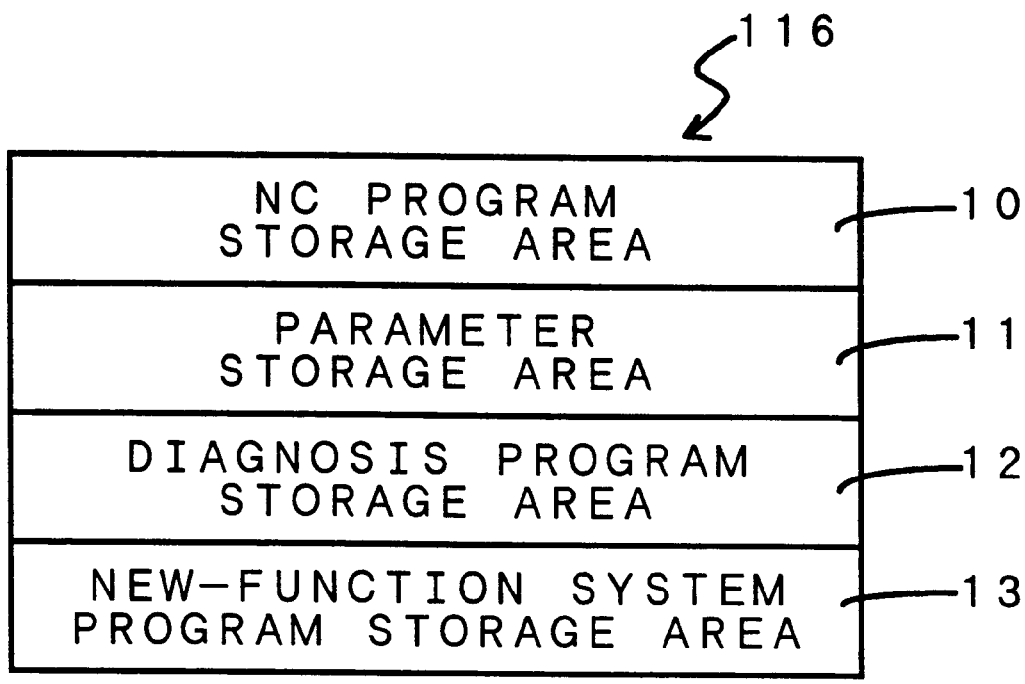
FIG. 2 is an explanatory illustration showing the contents of a disk unit of an application unit.

In the application unit 100 are provided a display unit 110 and a keyboard 111, which are connected to a CPU 113. The CPU 113 performs display control for displaying various kinds of data on the display unit 110, such as a result of calculation and a result of monitor of the control status of the control unit 200a. A ROM 114 stores therein a program for displaying information on the display unit 110 and for inputting data through the keyboard 111. A RAM 115 is used to temporarily store data to be exchanged between the application unit 100 and the control unit 200a. As shown in FIG. 2, the disk unit 116 has a diagnosis program storage area 12 and a new-function system program storage area 13, as well as an NC program storage area 10 and a parameter storage area 11. Diagnosis programs for locating an abnormal or defective portion of the control unit 200a are stored in the diagnosis program storage area 12. The CPU 113 is connected to the network N via the interface 117.

Figure 3:
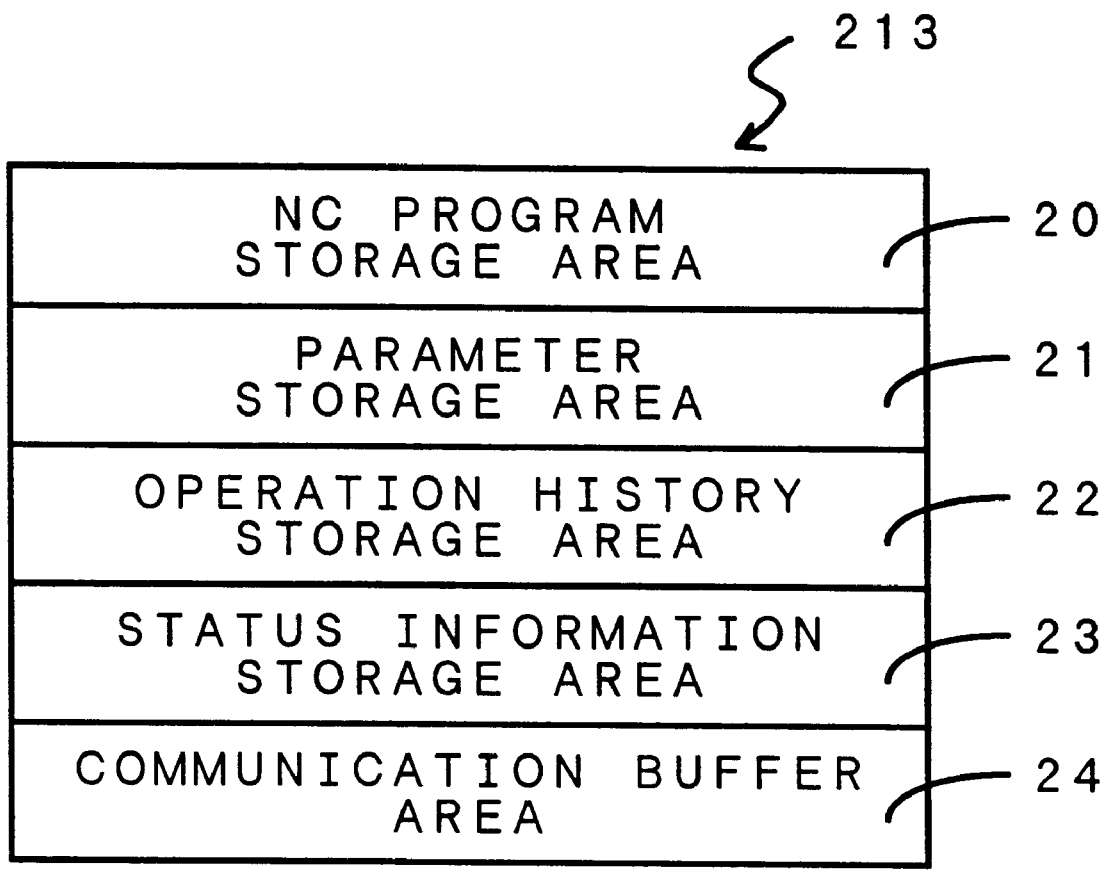
FIG. 3 is an explanatory illustration showing the contents of a RAM of a control unit according to the embodiment of the present invention.

The control unit 200a is composed of a CPU 211 connected to the network N via an interface 210, a ROM 212, a RAM 213, and interfaces 214 and 215. The ROM 212 stores therein a plurality of kinds of system programs corresponding to various kinds of functions (G-code functions, F-code functions) used for indexing, rapid feed, positioning, etc. which are used for numerically controlling a machine tool 400a. As shown in FIG. 3, the RAM 213 has an NC program storage area 20, a parameter storage area 21, an operation history storage area 22, a status information storage area 23, and a communication buffer area 24. In the NC program storage area 20 is stored an NC program necessary for causing the machine tool 400a to perform a predetermined machining operation. In the operation history storage area 22 is stored an operation history covering a predetermined period of time. In the status information storage area 23 are stored present operation statuses, such as start or emergency stop, of the control unit 200a and other units connected thereto, and an abnormality code that is generated in response to occurrence of an abnormality. Examples of such an abnormality code include ones indicating abnormality of coolant supply, tool breakage, and the like. The communication buffer area 24 is used for data exchange with the application unit 100. When one of the NC programs stored in the disk unit 116 is selected through operation of the keyboard 111 of the application unit 100, the selected NC program is transmitted to the control unit 200a and is stored in the NC program area 20 of the RAM 213.

At predetermined time intervals, the CPU 211 of the control unit 200a detects the statuses of objects controlled by the control unit 200a as well as the operation status of the control unit 200a itself, such as an operating state or an emergency stop state. The CPU 211 stores the detected operation status in the status information storage area 23 and updates it whenever necessary. Also, the CPU 211 stores in the operation history storage area 22 the history of operation covering a predetermined period of time.

The CPU 211 is connected to the compact operation panel 300a via the interface 214, as well as to the machine tool 400a via the interface 215. Therefore, the CPU 211 can control the machine tool 400a numerically.

On the operation panel 300a are provided a display unit 310 for displaying, for example, data necessary for ordinary machining operation, and an operation button group 311 consisting of a start button 311a for instructing start of the machine tool 400a and an emergency stop button 311b for instructing emergency stop of the machine tool 400a. The operation button group 311 is connected to the control unit 200a via an interface 312.

Next, the operation of the CPU 113 of the application unit 100 and the operation of the CPU 211 of the control unit 200a will be described for case I wherein monitoring is conducted, for case II wherein there is used a new function that is not supported by the control unit 200a, and for case III wherein an abnormality occurs.

Figure 4A:
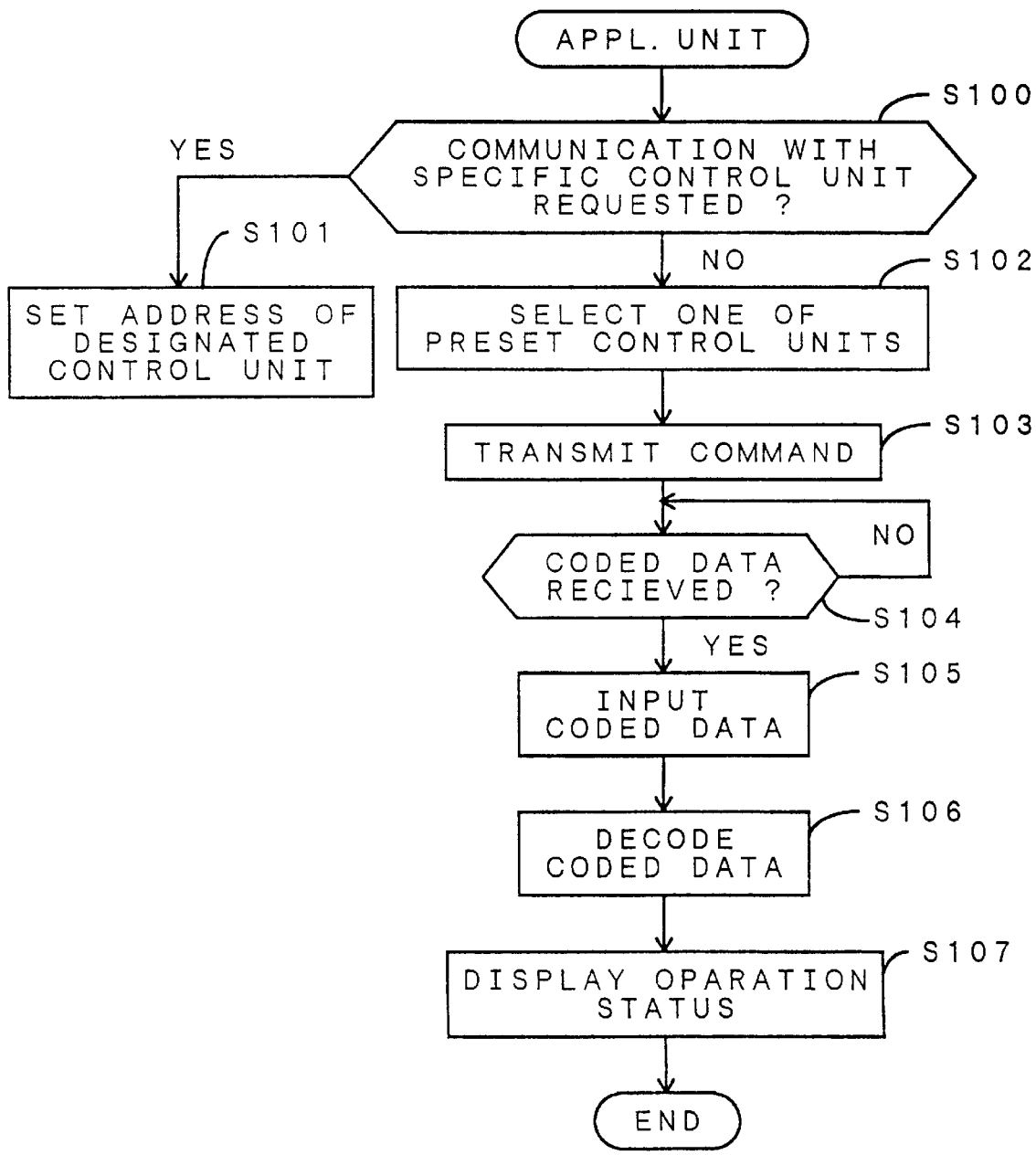
FIGS. 4A and 4B are flowcharts showing processing for enabling the application unit to monitor the control unit.

Case I:

The operating status of the control unit 200a is monitored through operation of the application unit 100 and is displayed. The operations of the CPUs 113 and 211 during such monitoring will be described with reference to the flowcharts shown in FIGS. 4A and 4B.

In step S100, based on the operation of the keyboard 111 of the application unit 100, a judgment is made as to whether communication with a specific control unit is requested. When it is judged that communication with the control unit 200a is requested, the processing moves to step S101 in order to set the address of the control unit 200a and other items. When it is judged that no control unit is designated, the processing moves to step S102 in order to select one of the control units connected to the network N in a predetermined sequence and to set the address of the selected control unit and other items for carrying out communication.

In step 103, a monitor/display command is sent to the control unit designated in step S101 or S102. In this case, the monitor/display command is sent to the control unit 200a.

In the control unit 200a, the monitor/display command sent from the application section 100 is received in step S200.

Since the received command is the monitor/display command, in step S201 the contents of the status information storage area 23 of the RAM 213 is read out, and the operation status is checked.

In step S202, the contents of the status information storage area 23 read out in step S201 is coded in order to obtain transmission data (hereinafter referred to as "coded data").

Figure 4B:
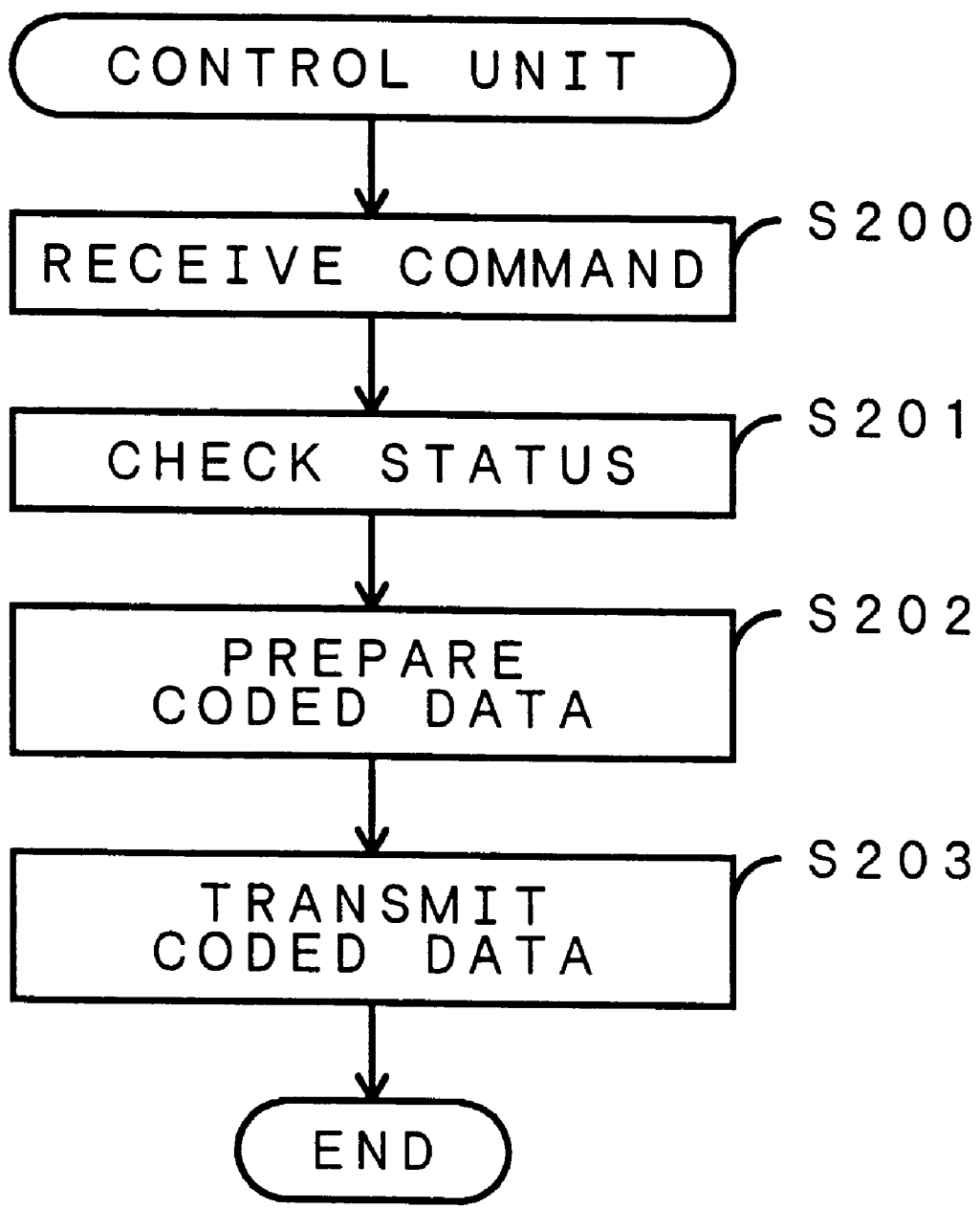

In step S203, the coded data obtained in step S202 is transmitted to the application unit 100, and the processing of the flowchart shown in FIG. 4B is ended.

Subsequently, the monitor processing of the CPU 113 of the application unit 100 is resumed.

In step S104, a judgment is made as to whether coded data has been received from the control unit 200a. When it is judged that coded data has been received, the processing moves to subsequent step S105.

In step S105, the coded data transmitted from the control unit 200a is input, and in step S106, the received coded data is decoded.

In step S107, the control status (e.g., whether the control unit 200a is in an operating state or in an emergency stop state) is displayed by the color of a part of the screen, which differs according to whether the control unit 200a is in the operating state or in the emergency stop state.

In the above-described manner, data are exchanged between the application unit 100 and the control unit 200a via the network N.

Case II:

When the control unit 200a controls the machine tool 400a in accordance with an NC program composed of a plurality of blocks stored in the RAM 213 and judges that the NC program contains a new function, such as a new G-code function, whose system program is not stored in the ROM 212, the system program for the new function is automatically transmitted from the application unit 100 to the control unit 200a. The operations of the CPUs 113 and 211 in such a case will be described with reference to the flowcharts shown in FIGS. 5A and 5B. Before a new function is used, a system program for the new function is stored into a new-function system program storage area 13 of the disk unit 116 corresponding to the new function, through operation of the keyboard 111 of the application unit 100.

Whenever one block of data of the NC program stored in the RAM 213 is read out, a judgment is made in step S300 as to whether a G code representing a new function (hereinafter referred to as the "new-function G-code") is contained in the read out block. When it is judged that the new-function G-code is not contained in the read out block, the processing of the flowchart shown in FIGS. 5B is ended in order to complete the processing for the read out block of the NC program.

When it is judged that the new-function G-code is contained in the read out block, the processing moves to subsequent step S301.

In step S301, a system program transmission request is transmitted to the application unit 100 together with the new-function G-code.

Figure 5A:
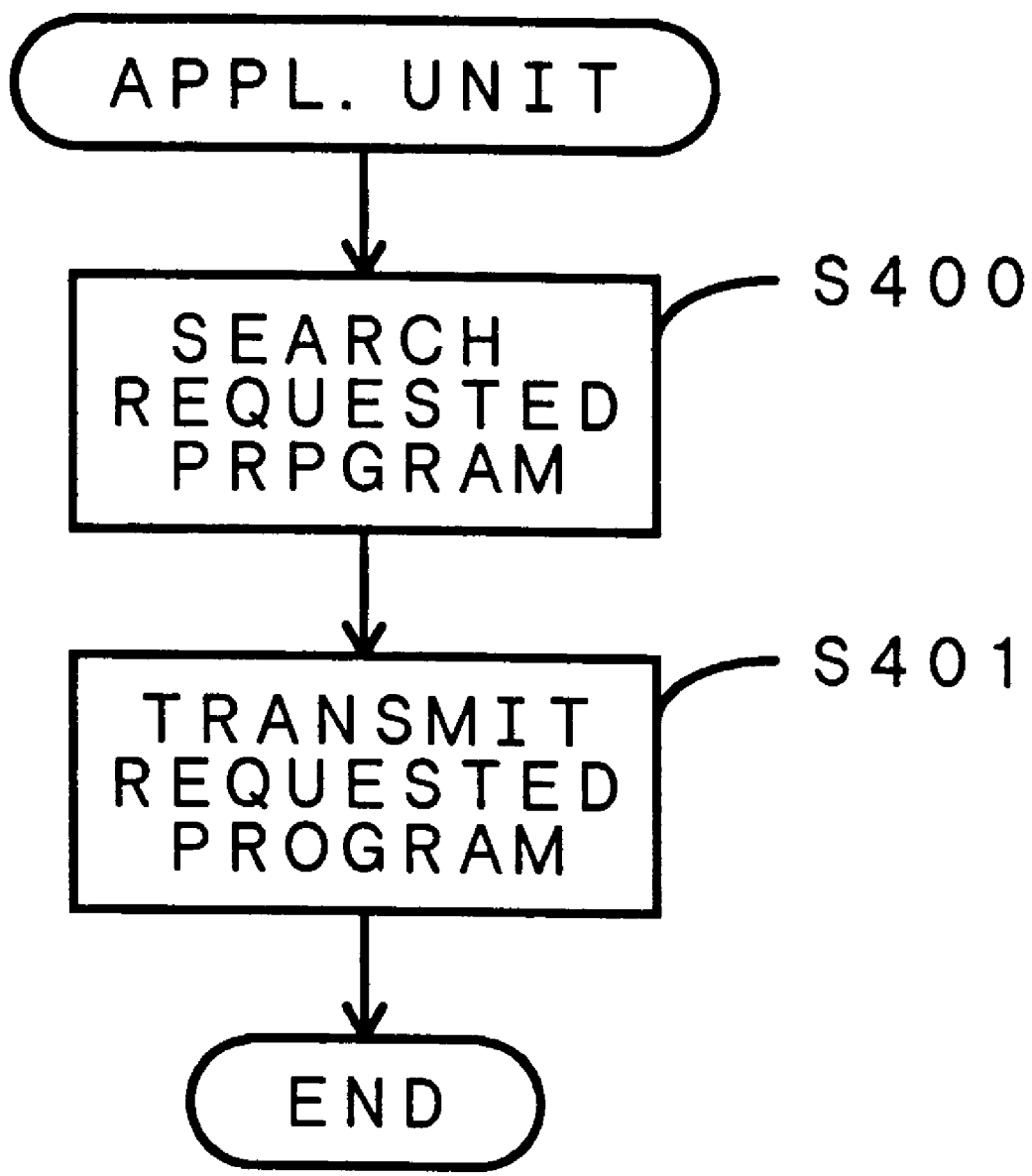
FIGS. 5A and 5B are flowcharts showing processing for the case where a new function is used in an NC program.
Figure 5B:
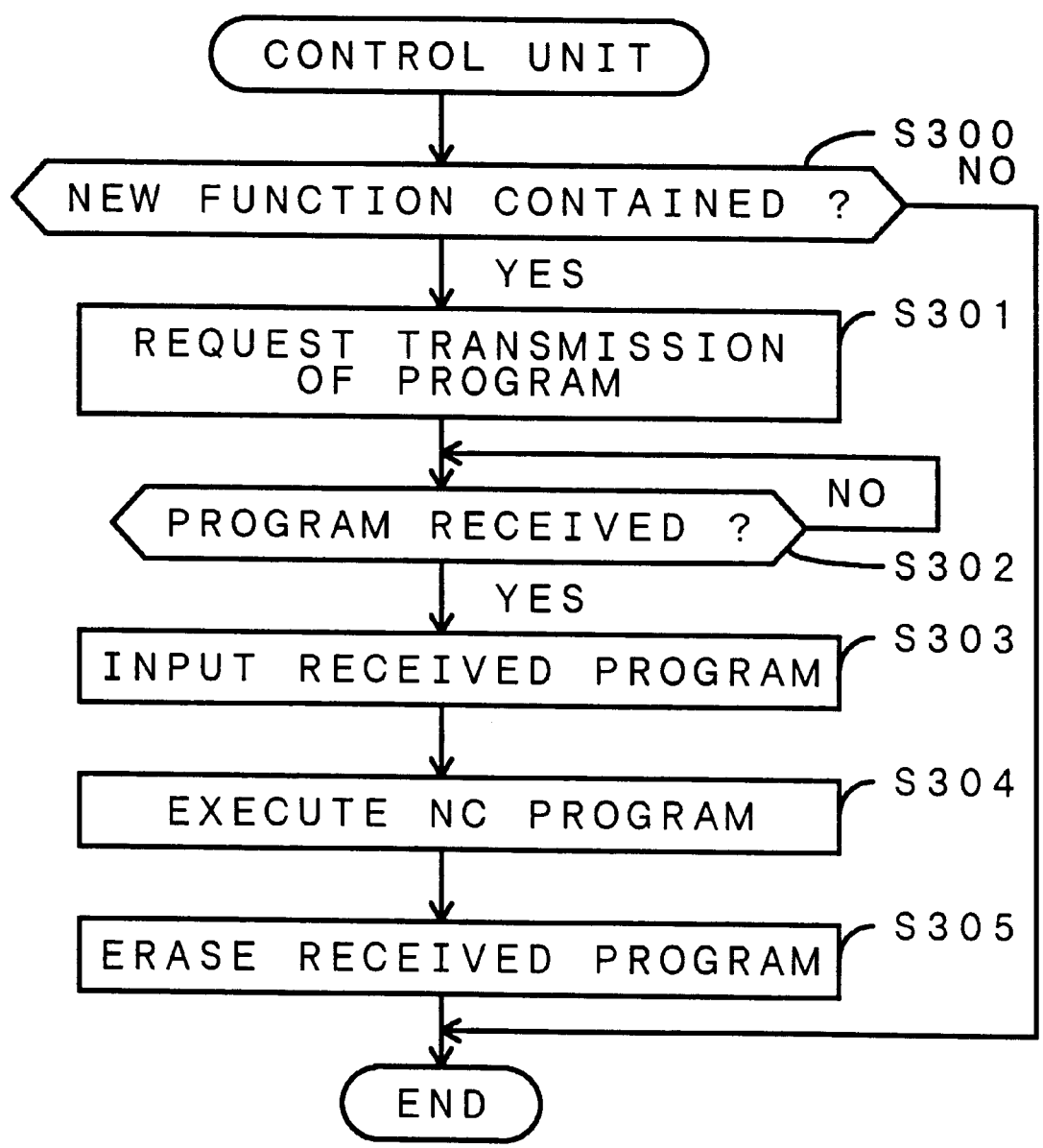

Upon reception of the transmission request, the application unit 100 starts the processing shown in FIG. 5A. In step S400, a system program corresponding to the G code is searched for and retrieved from among the various kinds of data stored in the NC program storage area 10 of the disk unit 116 and is then temporarily stored in the RAM 115.

In subsequent step S401, the system program that has been stored in the RAM 115 in step S400 and corresponds to the new-function G-code is transmitted to the control unit 200a, and the processing of the flowchart shown in FIG. 5A is ended.

Subsequently, the processing of the CPU 211 of the control unit 200a is resumed.

In step S302, a judgment is made as to whether the requested system program has been received from the application unit 100. When it is judged that the requested system program has been received, the processing moves to subsequent step S303.

In step S303, the requested system program transmitted from the application unit 100 is input and stored in the communication buffer area 24 of the RAM 213.

In step S304, the block of the NC program that includes the new-function G-code is executed. After completion of the processing for the G code, the system program for the new-function G-code stored in the communication buffer area 24 of the RAM 213 is erased in step S305, and the processing of the flowchart shown in FIG. 5B is ended.

In the present embodiment, the processing of the flowchart shown in FIG. 5A is performed in real time while the machine tool 400a is controlled. However, the present invention can be applied to the case where a plurality of blocks of the NC program subsequent to the present block are read in advance. Also, the above-described embodiment may be modified such that before the control of the machine tool 400a is started, the NC program is executed in order to store in the communication buffer area 24 of the RAM 213 a plurality of system programs corresponding to new functions. In this case, the processing in step S305 for erasing the contents of the RAM 213 is performed after completion of all the blocks of the NC program.

In the present embodiment, a description has been given of transmission of system programs for new functions.

However, the present embodiment may be modified to transmit to the control unit 200*a* a system program which is used only, for example, once a year.

Case III:

When an abnormality occurs while the machine tool 400*a* is controlled by the control unit 200*a*, abnormality diagnosis processing is performed. The operations of the CPUs 113 and 211 for the abnormality diagnosis will be described with reference to the flowcharts shown in FIGS. 6A and 6B.

When an abnormality occurs while the machine tool 400*a* is controlled by the control unit 200*a*, in step S500 the control unit 200*a* stores into the status information storage area 23 of the RAM 213 a flag indicating the occurrence of an abnormality and an abnormality code indicating the detail of the abnormality, and sends the abnormality code to the application unit 100.

In step S600, the application unit 100 receives the abnormality code transmitted from the control unit 200*a*.

In step S601, a diagnosis program corresponding to an abnormality code received in step S600 is searched for and retrieved based on a coordinate indexing table shown in FIG. 7, and is then stored in the diagnosis program storage area 12 of the disk unit 116. The coordinate indexing table includes abnormality codes and the names of diagnosis programs corresponding to the abnormality codes. In the coordinate indexing table shown in FIG. 7, each abnormality code has 12 digits. However, when the number of digits of an abnormality code generated upon occurrence of a corresponding abnormality is less than 12, "*" is placed into the null digit(s).

Figure 6A:
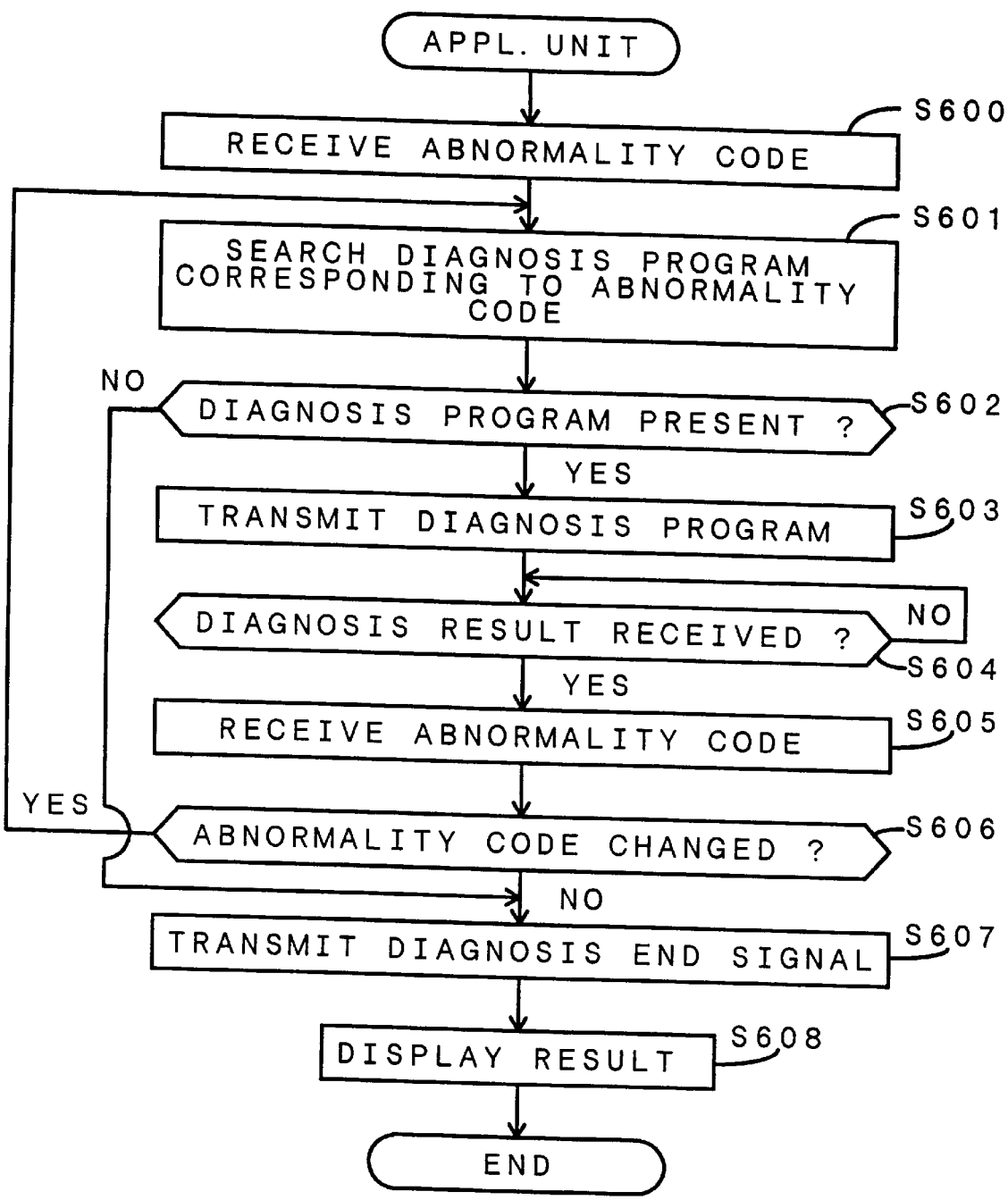
FIGS. 6A and 6B are flowcharts showing processing for abnormality diagnosis.

In step S602, a judgment is made as to whether the coordinate indexing table shown in FIG. 7 contains the name of a diagnosis program corresponding to the abnormality code that was received in step S600. When it is judged that the coordinate indexing table does not contain the name of a diagnosis program corresponding to the received abnormality code, the processing moves to step S607 in order to sent a diagnosis completion signal to the control unit 200*a*. Subsequently, the processing of the flowchart shown in FIG. 6A is ended. When it is judged that the coordinate indexing table contains the name of a diagnosis program corresponding to the received abnormality code, the processing moves to step S603. In step S603, a corresponding diagnosis program whose name was found in the table is searched for and retrieved from among the diagnosis programs stored in the diagnosis program storage area 12 of the disk unit 116 and is then transmitted to the control unit 200*a*.

In the control unit 200*a*, a judgment is made in step S501 as to whether the diagnosis program has been received from the application unit 100. When it is judged that the diagnosis program has been received, the processing moves to subsequent step S502.

In step S502, the diagnosis program is input and stored in the communication buffer area 24 of the RAM 213.

In step S503, the diagnosis program stored in the communication buffer area 24 is executed, and in step S504, an abnormality code that is generated as a result of execution of the diagnosis program is transmitted to the application unit 100.

Figure 6B:
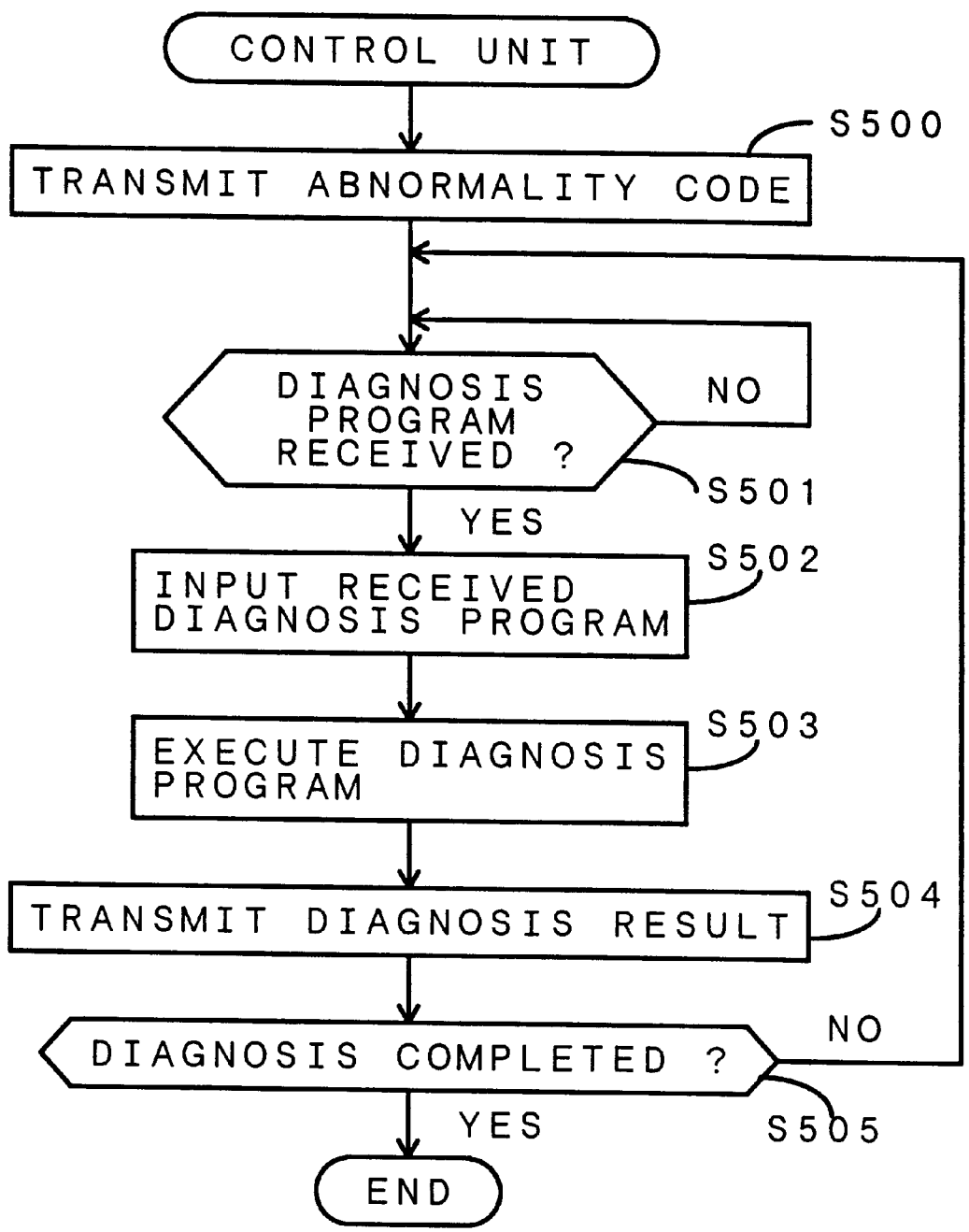

In step S505, a judgment is made as to whether a diagnosis completion signal has been sent from the application unit 100. When it is judged that the diagnosis completion signal has been received, the processing of the flowchart shown in FIG. 6B is ended. When it is judged that the diagnosis completion signal has not been received, the processing moves back to step S501.

In the CPU 113 of the application apparatus 100, a judgment is made in step S604 as to whether an abnormality code has been received from the control unit 200*a*. When it is judged that the abnormality code has been received, the processing moves to subsequent step S605. In step S605, the abnormality code transmitted from the control unit 200*a* is received.

In step S606, a judgment is made as to whether the abnormality code received as result of the diagnosis differs from the abnormality code received in step S600; i.e., whether the abnormality code has changed as a result of the diagnosis. When it is judged that the abnormality code has changed, the processing in step S601 and subsequent steps is executed for the new abnormality code. When it is judged that the abnormality code has not changed, the processing moves to subsequent step S607 in order to transmit a signal indicating the completion of diagnosis of the control unit 200*a*.

In step S608, a diagnosis result composed of an abnormality code, a message indicating measure for the abnormality, etc. is displayed on the display unit 110 of the application unit 100. Subsequently, the processing of the flowchart shown in FIG. 6A is ended.

As described above, abnormality diagnosis is carried out on the control unit 200*a* side in accordance with a corresponding diagnosis program, and only the result of the diagnosis is transmitted to the application unit 100. Accordingly, the load of the communication means can be reduced as compared to the case where the application 100 receives from the control unit 200*a* a huge amount of data required for abnormality diagnosis and the application unit 100 carries out abnormality diagnosis.

Also, since a single diagnosis program required for abnormality diagnosis is transmitted from the application unit 100 to the control unit 200*a* and is stored in the communication buffer area 24 of the RAM 213, the storage capacity of the RAM 213 can be decreased.

If an abnormality occurs in the control unit 200*b* connected to the network N when the application unit 100 is connected to the control unit 200*a*, the processing for the control unit 200*a* is temporarily suspended, and the abnormality of the control unit 200*b* is displayed on the display unit 110. Subsequently, the abnormality of the control unit 200*b* is diagnosed. After completion of the abnormality diagnosis, the processing for the control unit 200*a* is resumed.

Figure 8:
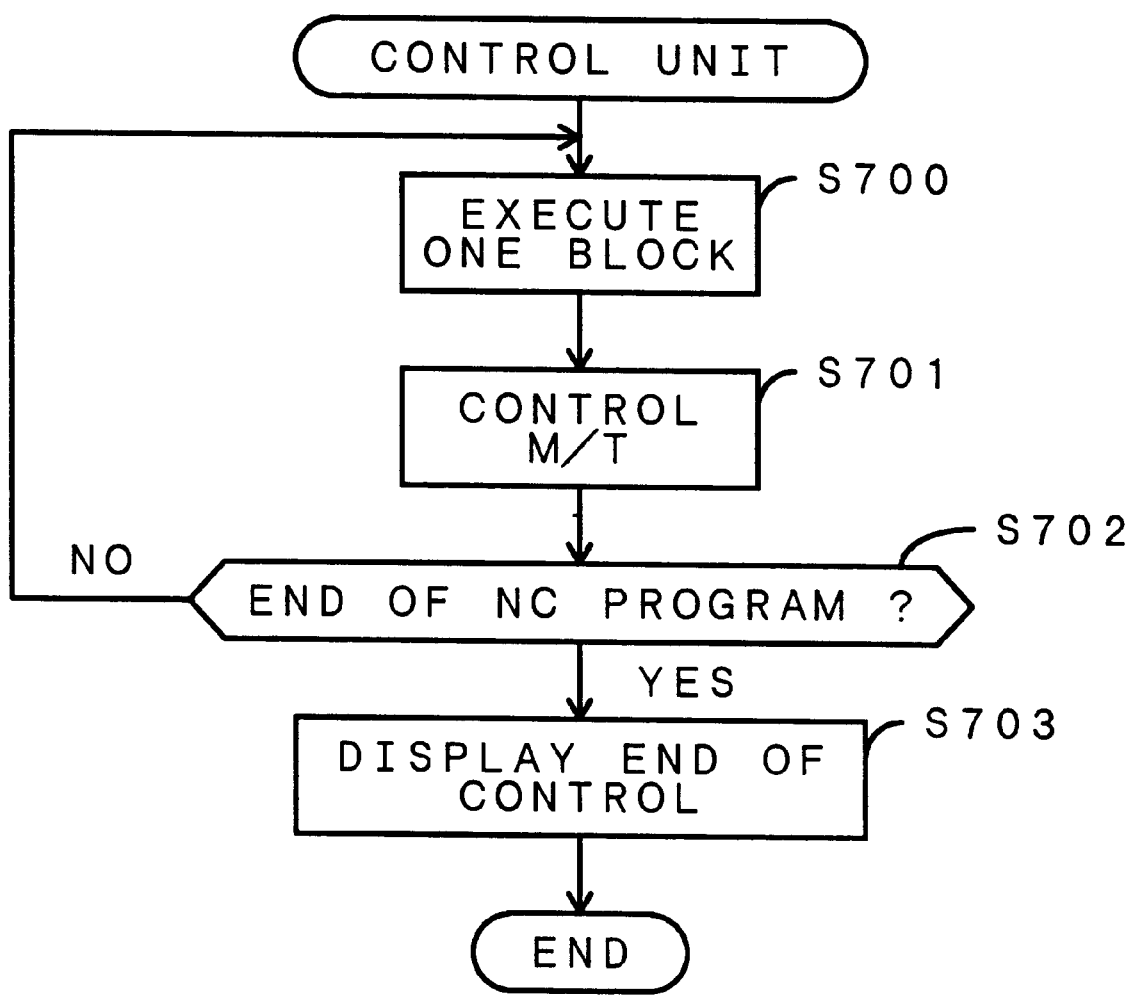
FIG. 8 is a flowchart showing processing of the control unit for controlling a machine tool.

Next, with reference to the flowchart of FIG. 8, a description will be given of the operation of the control unit 200*a* when the control units 200*a* controls the machine tool 400*a* independently of the application unit 100.

When a machine operator depresses the start button 311*a* of the compact operation panel 300*a*, a start instruction is input to the CPU 211 via the interfaces 312 and 214, so that the processing in steps S700–S703 is carried out.

In step S700, the NC program stored in the RAM 213 is executed block by block in accordance with the system program stored in the ROM 212.

In step S701, the machine tool 400*a* is controlled via the interface 215 in accordance with the result of the execution in step S700.

In step S702, it is judged whether all the steps or blocks of the NC program have been executed. When it is judged that all the steps or blocks of the NC program have not been executed, the processing moves back to step S700 in order to execute the next block of the NC program.

When it is judged that all the steps or blocks of the NC program have been executed, the processing moves to step S703 in order to display an end message on the display unit 310 of the operation panel 300*a* via the interfaces 214 and 312.

As described above, the control unit 200a can start the control of the machine tool 400a through operation of the operation panel 300a.

Since a single application unit 100 and a plurality of control units 200a and 200b can be connected via the network N, it becomes unnecessary to provide the control units 200a and 200b on the machine tool side with the large display 110 and the keyboard 111, which the machine operator does not use. Accordingly, the sizes of the control units 200a and 200b can be reduced.

Also, since the control unit 200a can control the machine tool 400a through operation of the compact operation panel 300a, the control unit 200a can perform the control independently of the application unit 100 without operation of the application unit 100.

When the control unit 200a is caused to execute an NC program including a function that is not stored in the ROM 212 of the control unit 200a, a system program required for the function is transmitted from the application unit 100 to the control unit 200a. Therefore, system programs for new functions are not required to be stored in the ROM 212 of the control unit 200a.

In the above-described embodiment, a description is given for the control unit 200a, a similar control is performed for the control unit 200b, which is also connected to the network N.

Obviously, numerous modifications and variations of the present invention are possible in light of the above teachings. It is therefore to be understood that within the scope of the appended claims, the present invention may be practiced otherwise than as specifically described herein.

What is claimed is:

1. A numerical controller comprising:

a control section for controlling operation of a machine;

an application section which is separated from said control section for inputting data into said control section and for monitoring a control status;

communication means including a network for connecting said control section and said application section;

system program storage means provided in said application section for storing a system program for a function that is not supported by said control section;

judgment means for judging whether an NC program sent from said application section to said control section includes a command which requires the system program for the function that is not supported by said control section; and transmission means for transmitting the system program for the function from said application section to said control section when said judgment means judges that the system program of the function is required.

2. A numerical controller according to claim 1, wherein said application section comprises switch means that enables connection with a plurality of said control sections.

3. A numerical controller according to claim 1, wherein said control section comprises control means for controlling said machine independently of said application section, and control initiation instructing means for instructing said control means to start the control.

4. A numerical controller according to claim 1, further comprising:

diagnosis program storage means provided in said application section for storing a plurality of diagnosis programs for diagnosing abnormalities which may occur in said control section;

abnormality data transmission means for transmitting to said application section abnormality data indicating the details of an abnormality of said control section upon occurrence of such an abnormality in said control section;

diagnosis program selection means for selecting a diagnosis program required for abnormality diagnosis of said control section in accordance with the abnormality data transmitted from said abnormality data transmission means;

diagnosis program transmission means for transmitting the selected diagnosis program to said control section;

diagnosis program execution means provided in said control section in order to execute the transmitted diagnosis program; and diagnosis result transmission means for transmitting a diagnosis result to said application section to display the diagnosis result.

* * * * *